United States Patent [19]

Gits

[11] Patent Number: 5,154,286
[45] Date of Patent: Oct. 13, 1992

[54] REUSABLE SHIPPING FRAME AND ADAPTOR SADDLES

[76] Inventor: Jules C. Gits, 155 Brandon, Glen Ellyn, Ill. 60137

[21] Appl. No.: 690,075

[22] Filed: Apr. 23, 1991

[51] Int. Cl.⁵ .................. B65D 19/26; B65D 19/44
[52] U.S. Cl. .................................. 206/386; 206/319; 206/600
[58] Field of Search .................. 206/3, 317, 319, 386, 206/485, 596, 599, 600

[56] References Cited

U.S. PATENT DOCUMENTS

| | | | |
|---|---|---|---|
| 2,341,801 | 2/1944 | Miller | 206/319 |
| 2,428,500 | 10/1947 | Nutt | 206/319 |
| 3,889,831 | 6/1975 | Davis | 206/596 |
| 4,098,409 | 7/1978 | Massey | 206/319 |
| 4,117,927 | 10/1978 | Gothsche | 206/319 |
| 4,403,697 | 9/1983 | Forshee | 206/319 |
| 4,412,615 | 11/1983 | Forshee | 206/319 |
| 4,491,076 | 1/1985 | Forshee | 206/600 |
| 4,735,310 | 4/1988 | Lemery et al. | 206/319 |
| 4,756,413 | 7/1988 | Gits | 206/319 |
| 4,938,350 | 7/1990 | Grigsby | 206/319 |

Primary Examiner—Jimmy G. Foster
Attorney, Agent, or Firm—Wallenstein, Wagner, & Hattis, Ltd.

[57] ABSTRACT

A shipping frame for packaging large, heavy articles of manufacture that have studs for supporting the article, an example being an automobile engine. The frame generally comprises a lower portion, a plurality of middle members and an upper portion that join together to form a unitary structure. The lower portion contains risers and adapter saddles that supportably engage the studs of the article. Each portion or member of the frame is foamed of structural foam material such as high density polyethylene. Still, the frame may be collapsed and reassembled in a compact arrangement to facilitate return shipping.

28 Claims, 8 Drawing Sheets

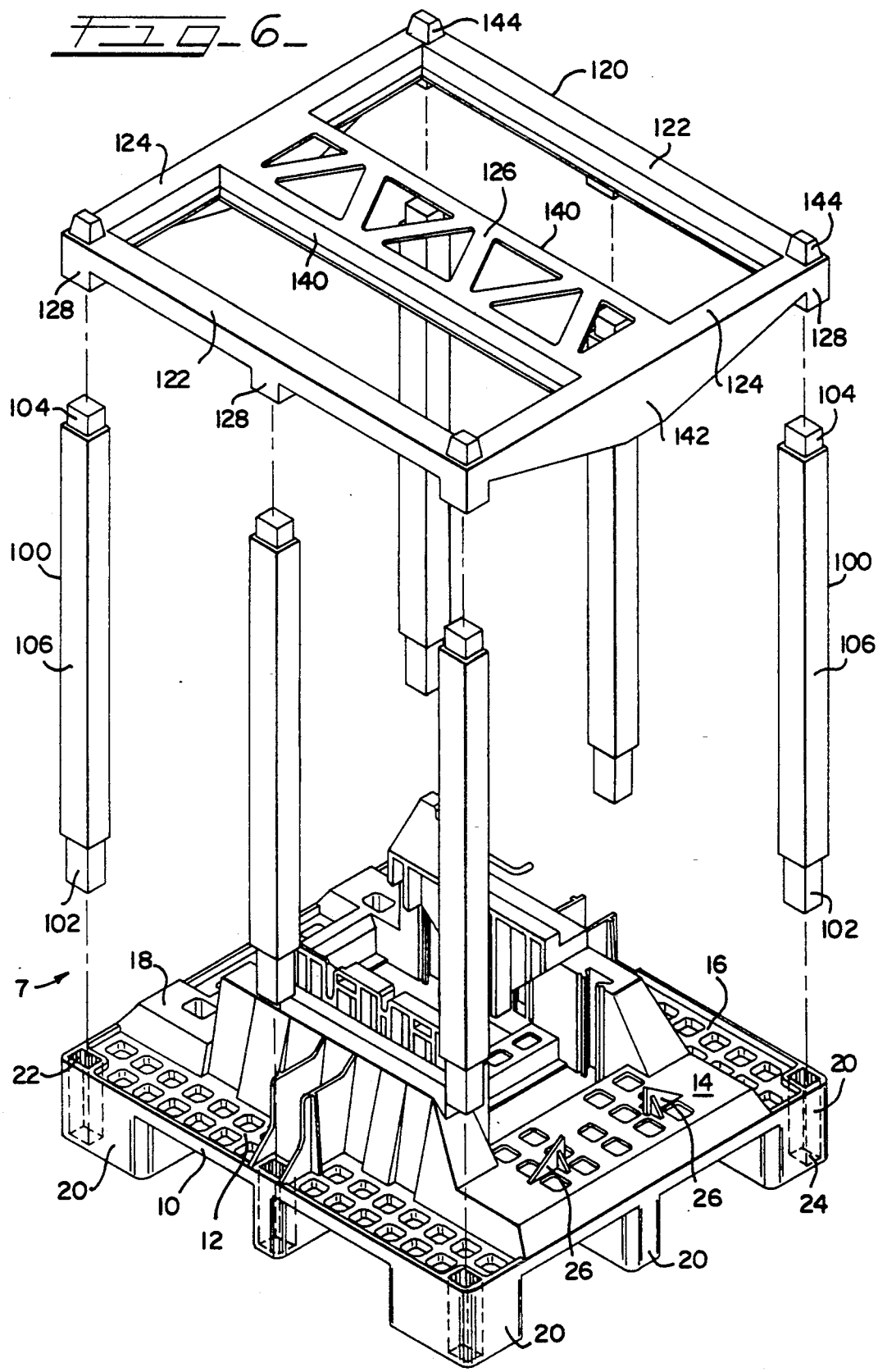

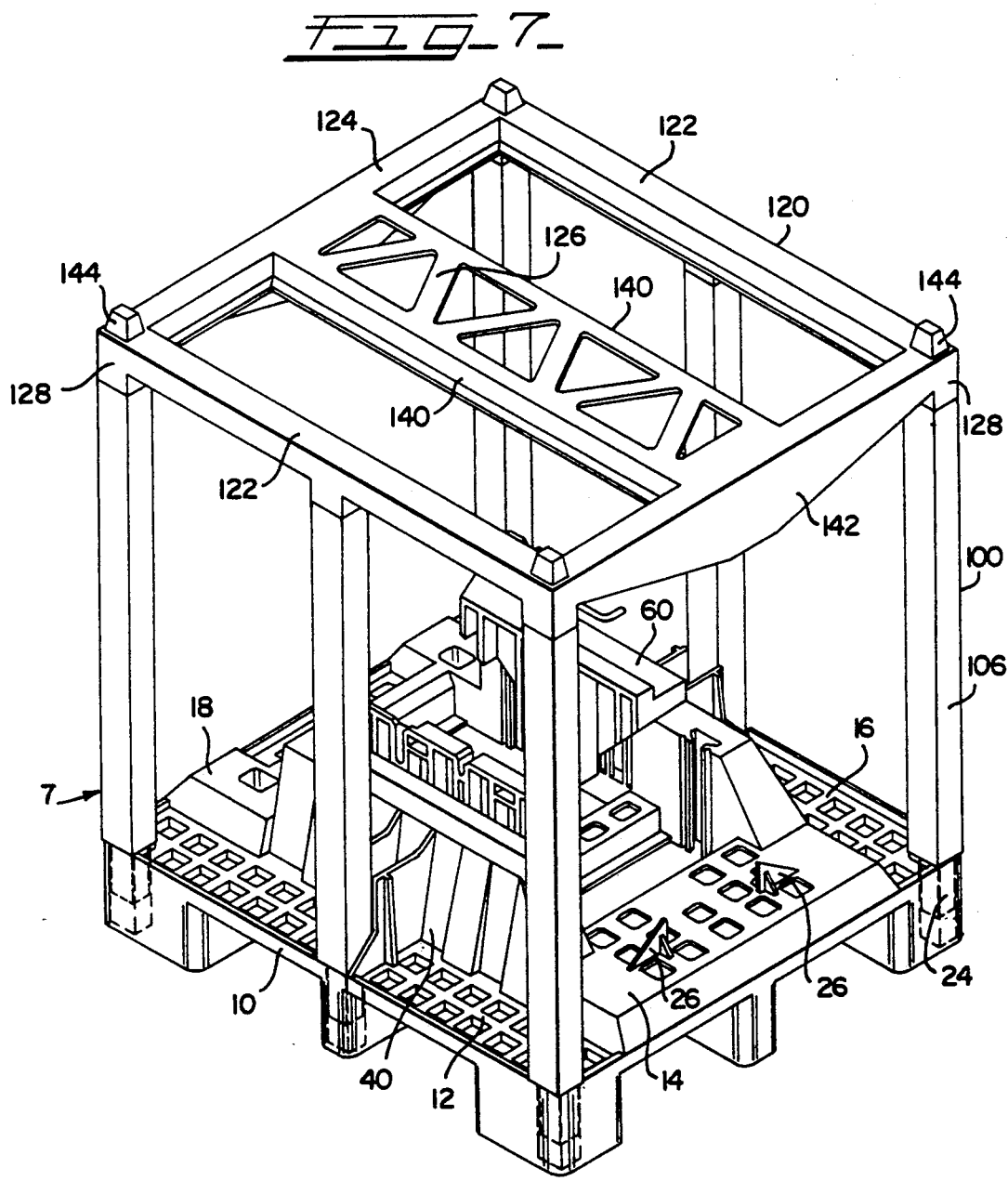

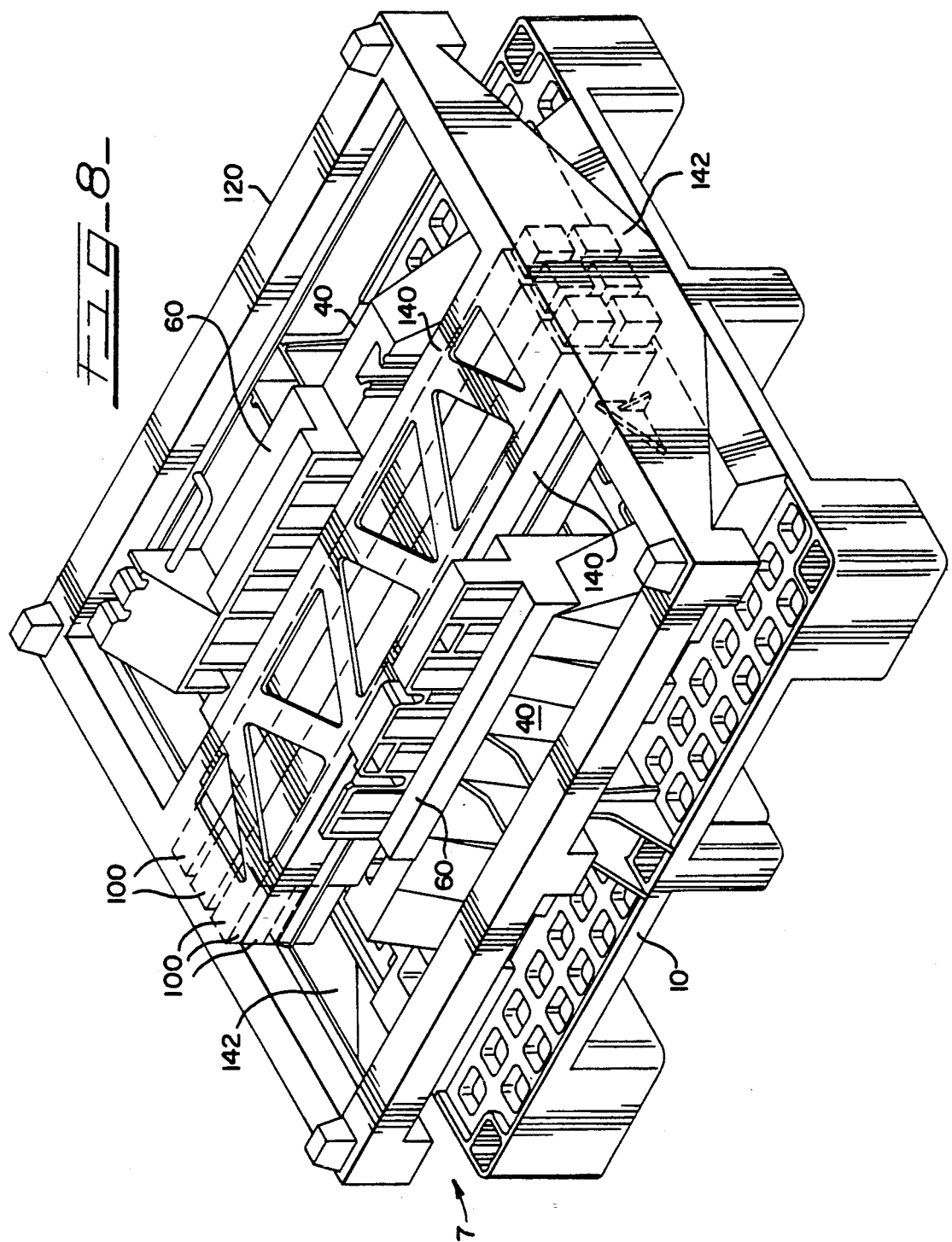

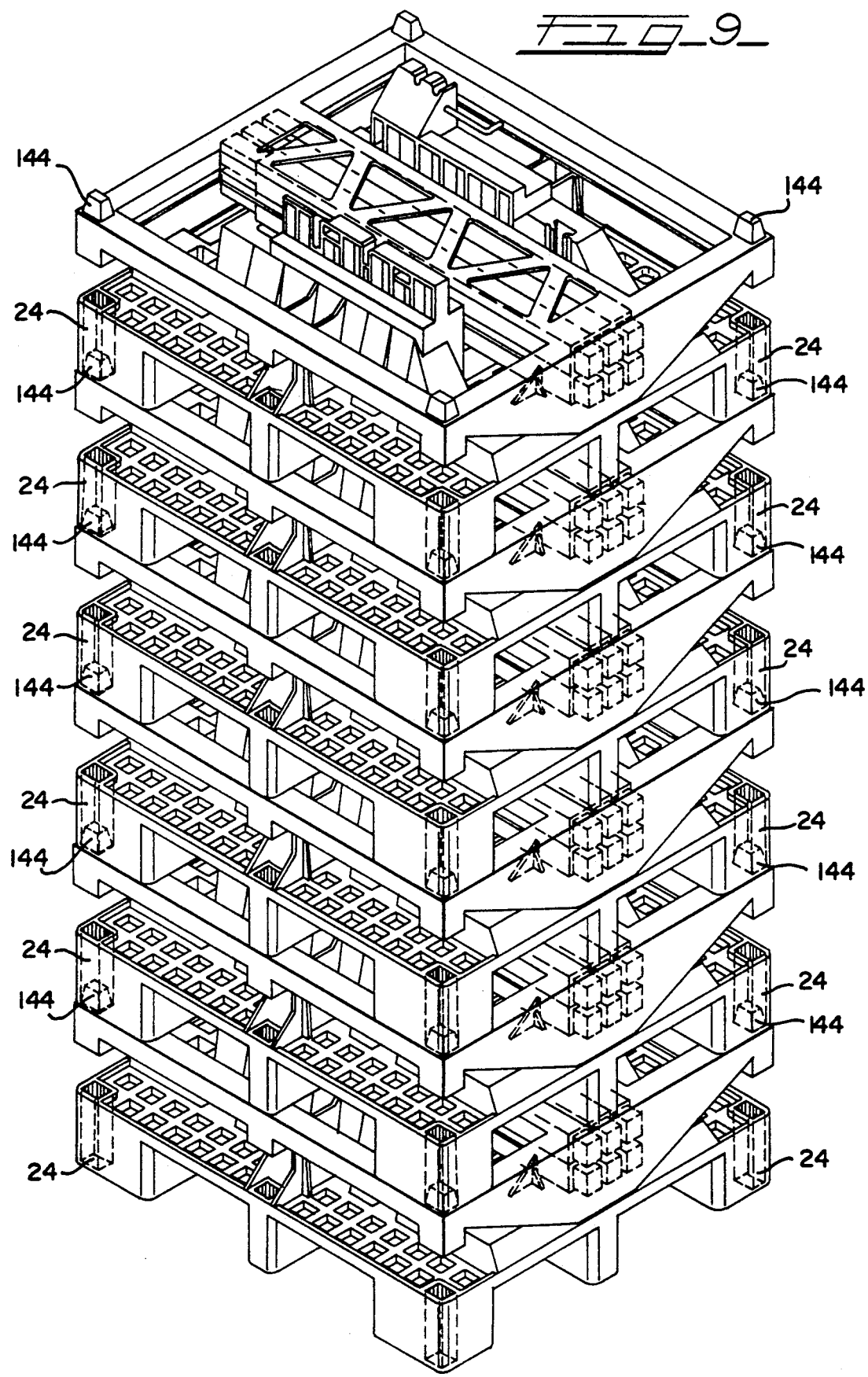
FIG_9_

REUSABLE SHIPPING FRAME AND ADAPTOR SADDLES

TECHNICAL FIELD OF THE INVENTION

The invention relates generally to a shipping frame for packaging an article of manufacture by supportably engaging the studs of the article, the frame being disassemblable and stackable to facilitate return shipments.

BACKGROUND PRIOR ART

The packaging industry has recently recognized the value of disassemblable and reusable shipping frames for use in packaging large, heavy articles of manufacture. An example of such a shipping frame is exemplified in U.S. Pat. No. 4,756,413, the disclosures of which are incorporated in their entirety by reference. These reusable shipping frames are presently being used to ship and store large, heavy goods such as an inboard or outboard marine engines.

As disclosed in the foregoing patent such shipping frames are characterized by having a base skeleton, leg members and a top skeleton that are joined together to form a unitary structure which supports and protects an article during shipment. The parts of the shipping frame may be made of structural foam material which absorbs shock that may otherwise damage the article during shipment.

The base skeleton is formed of integrally molded peripheral members arranged to define the outer margins of the bottom side of the shipping frame. This lower portion is also designed to receive the tines of a fork lift truck.

A cross brace member is integrally molded with said peripheral base members and extends between these base members. The cross brace member includes a mounting portion and a support portion. The mounting portion is shaped to accommodate an article such as an engine whereas the support portion is designed to distributed the load to the base members.

The top skeleton is formed of integrally molded peripheral top members arranged to define the outer margins of the top side of the shipping frame. This top skeleton is designed so that, if turned upside down and rotated 180 degrees, it will nest with the base skeleton and form a substantially flat assembly for compactness during return shipments.

The leg members are used to space apart the bottom and top skeletons and define the lateral sides of the shipping frame. As the leg members are removable from the top and base skeletons, they too may be arranged to lay flat during return shipments.

Presently, fasteners such as nuts and bolts or straps and bands are used to secure an article of manufacture to the shipping frame. For example, U.S. Pat. No. 4,756,413 discloses that the stern mounting bracket of an outboard marine engine may be fastened with nuts and bolts or clamps to one cross brace member and another cross-brace member will cradle the engine's lower gear case, with bands securing the lower gear case to the cross brace member. Usually, different fastening arrangement will be needed for the various types of articles that are packaged in this shipping frame.

Problems arise when an article is unable to be laid on the mounting portion of the cross brace member of U.S. Pat. No. 4,756,413 without causing damage to the article. This situation may arise if an article's engineering design criteria did not consider the problems associated with shipping or storage. This situation may also arise if economic considerations do not allow for the additional expenses necessary to overcome these problems.

For example, the automotive industry is faced with a fiercely competitive environment in which consumers desire economic and high mileage vehicles. Thus, manufacturers are not afforded the opportunity to take into consideration the many problems associated with shipping and storing the automobile engines prior to installing them in an automobile. Consequently, many engines are mounted on non-returnable wood bucks and rest on their oil pan flange. This shipping arrangement very often causes damage to the engine, generally in the oil pan flange area and increases the cost of the vehicle. This type of problem is typical for the shipping industry.

The present invention is provided to solve these and other problems.

SUMMARY OF THE INVENTION

According to the present invention, a shipping frame has been developed for packaging an article of manufacturer that has studs used to support the article. The shipping frame may include a base alone, or in combination with a top skeleton and leg members.

In both preferred embodiments, the base portion of the shipping frame has a deck and a plurality of spaced risers which distribute the weight of the article to the deck. In addition, adapter saddles are removably attached to the risers. These adapter saddles are shaped to accommodate the article of manufacturer and are provided with slots or holes into which the studs or protrusions of the article are inserted.

A top skeleton portion is comprised of outer peripheral members and a cross member. Both the peripheral members and the cross member are designed to mesh with the base portion in a substantially flat position. In addition, the top skeleton is designed to capture the leg members between itself and the base portion when assembled in the collapsed position.

The leg members have ends that are designed to removably join with the deck and the top skeleton, and a center portion that spaces the base and the top skeleton apart to accommodate an article of manufacture during shipment.

The present invention utilizes the fact that large, heavy articles of manufacture are frequently designed to be supported by specific studs, protrusions or recesses in the surface of the article. For example in the case of automobile engine, the engine studs are designed for mounting the engine to the frame of a vehicle. By utilizing these studs during shipment unnecessary engineering expenses can be avoided and unneeded material need not be added to the article for overcoming the problems associated with shipping, without incurring costly damage to the article.

An additional advantage of the present invention is that it provides for a shipping frame with components that are both disassemblable and nestable to facilitate compact return shipments to the engine plant. Thus, shipping and storage costs are reduced, and the price of the goods to the consuming public is lowered.

Other advantages and aspects of the invention will become apparent upon making reference to the specification, claims, and drawings to follow.

BRIEF DESCRIPTION OF DRAWINGS

FIG. 6 is a exploded perspective view of the shipping frame having a base, leg members and a top skeleton;

FIG. 7 is a perspective view of the shipping frame having a base, leg members and a top skeleton;

FIG. 8 is perspective view of the shipping frame assembled in a collapsed position; and, FIG. 9 is a perspective view of the shipping frame assembled in its collapsed and stacked position.

DETAILED DESCRIPTION OF THE INVENTION

Figure 1:
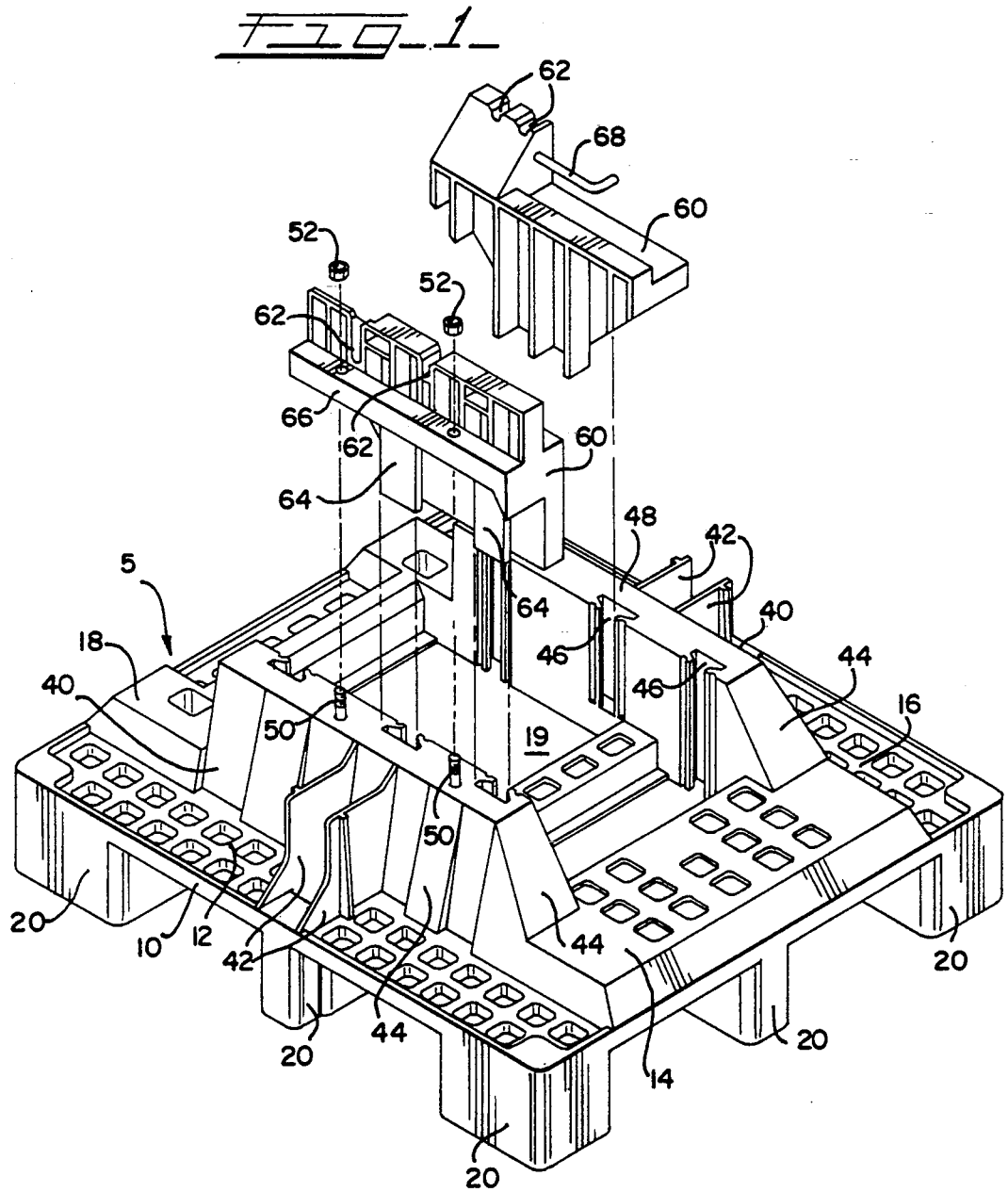
FIG. 1 is an exploded perspective view of the shipping frame having a deck, a pair of risers and a pair of adapter saddles.

While this invention is susceptible of embodiments in many different forms, there is shown in the drawings and will herein be described in detail, two preferred embodiments of the invention with the understanding that the present disclosure is to be considered as an exemplification of the principles of the invention and is not intended to limit the broad aspects of the invention to the embodiments illustrated.

Figure 2:
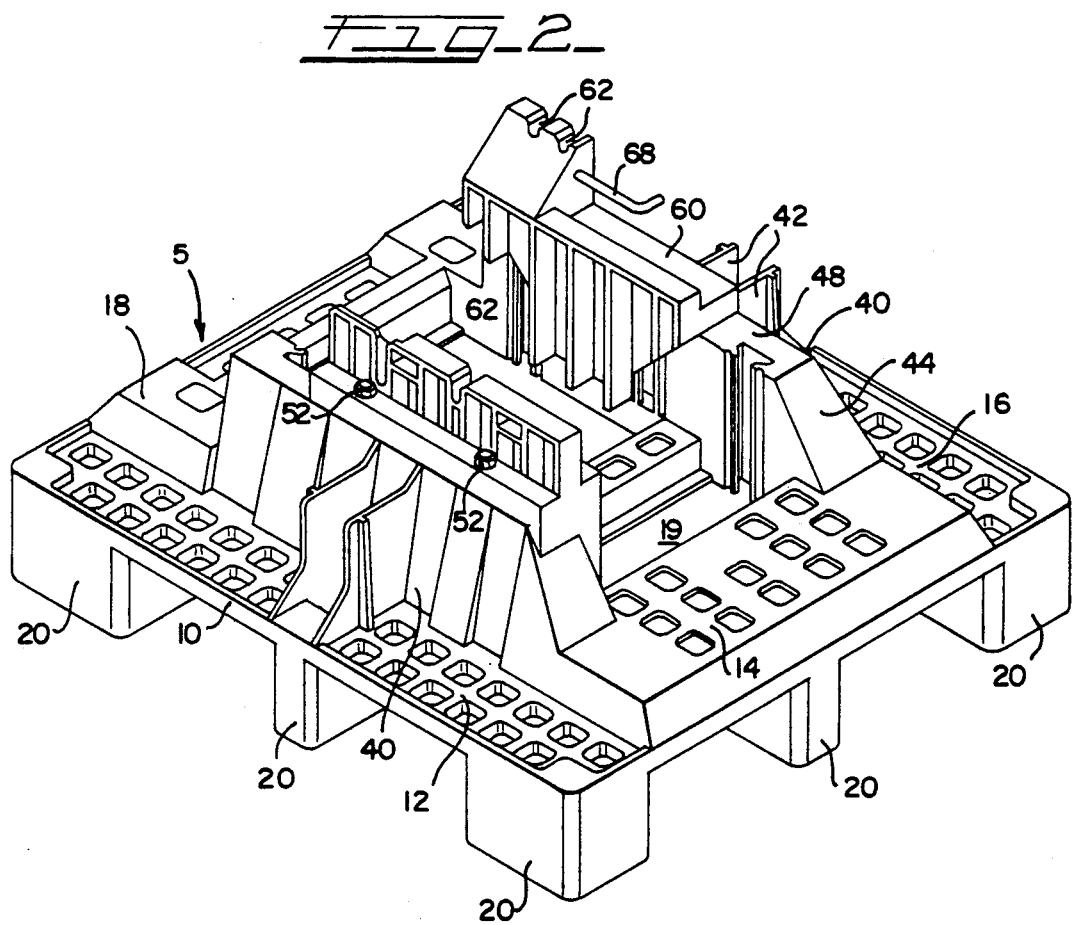
FIG. 2 is a perspective view of the shipping frame having a deck, a pair of risers and a pair of adapter saddles.
Figure 3:
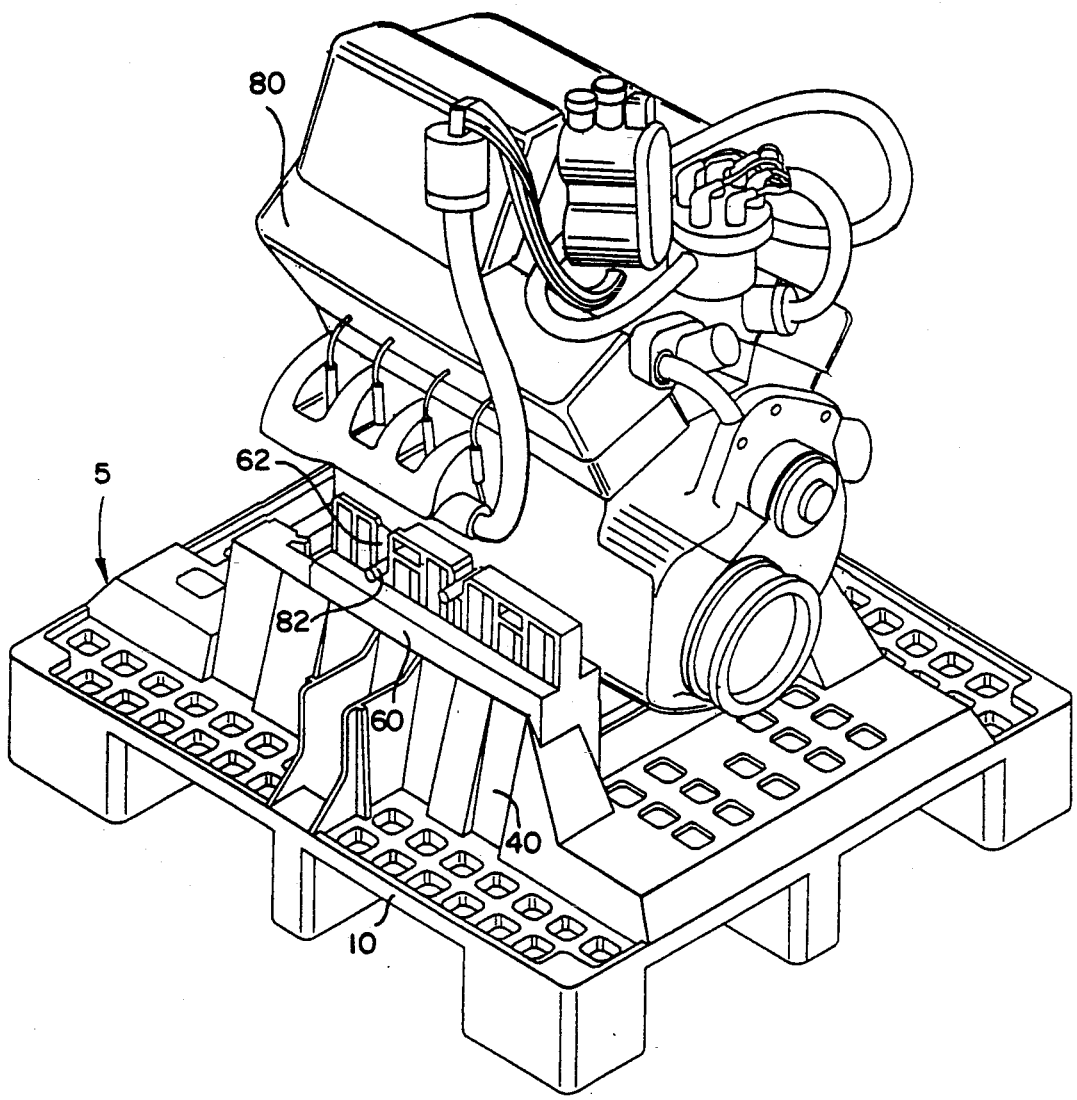
FIG. 3 is a perspective view of an article mounted to the shipping frame.

As shown in FIGS. 1, 2 and 3 one embodiment of the present invention is a shipping frame indicated generally by reference character 5. In this embodiment the shipping frame is comprised of a deck 10, a pair of risers 40 that are integrally molded to the deck, and a pair of adapter saddles 60 that are removably attached to the risers. These components are preferably made of structural foam material, such as high density polyethylene or other thermoplastics.

The deck 10 is robustly proportioned to carry the weight of a heavy article of manufacture, such as the automotive engine 80 shown in FIG. 3. Here, the deck is shown to have peripheral base members 12, 14, 16, and 18 which define the outer margins of the base. These peripheral base members also define an opening 19 which can be used as a means for accommodating an article of manufacture between said base members. These peripheral members are raised up by posts 20 so that the tines of a fork lift truck can engage and lift the shipping frame. Added structural support may be provided to the deck such as by middle brace member 30.

FIGS. 1-5 show a pair of risers 40 that are also robustly proportioned to carry the weight of a heavy article. These risers may be reinforced, by such means as double wall supporting portions 42, and sloped members 44. In addition, the risers are provided with a means for attaching adapter saddles to the risers. In FIG. 1, this means for attaching is an interlocking dovetail, the female dovetail portions 46 being located in the riser 40. Each riser also includes an abutment 48 against which an adapter saddle 60 may rest and through which the weight of the article is dispersed into the riser.

FIGS. 1-5 show a pair of adapter saddles 60 that are designed and shaped to accommodate an article of manufacture. Each adapter saddle 60 is formed to have horizontal slots 62 such as in FIGS. 1-4, or vertical slots 64 such as in FIG. 5, for supportably engaging the studs 82 or 84 of an article of manufacture. Each adapter saddle has a bottom surface 66 which rests against the abutment 48 of a riser when the adapter saddle is in place. In addition, the adapter saddle may be provided with a retainer 68 that can be used to lock an article to the shipping frame so that the studs do not become dislodged from the slots during shipment.

Figure 4:
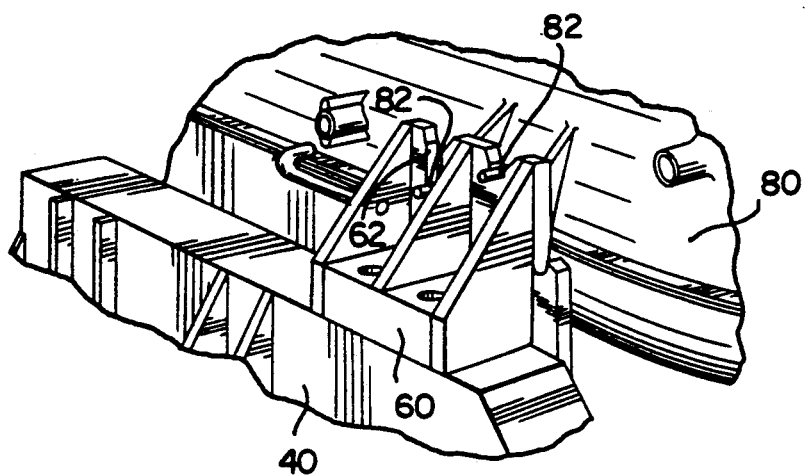
FIG. 4 is an enlarged perspective view of an adapter saddle that is supportably engaging an article with horizontal studs.
Figure 5:
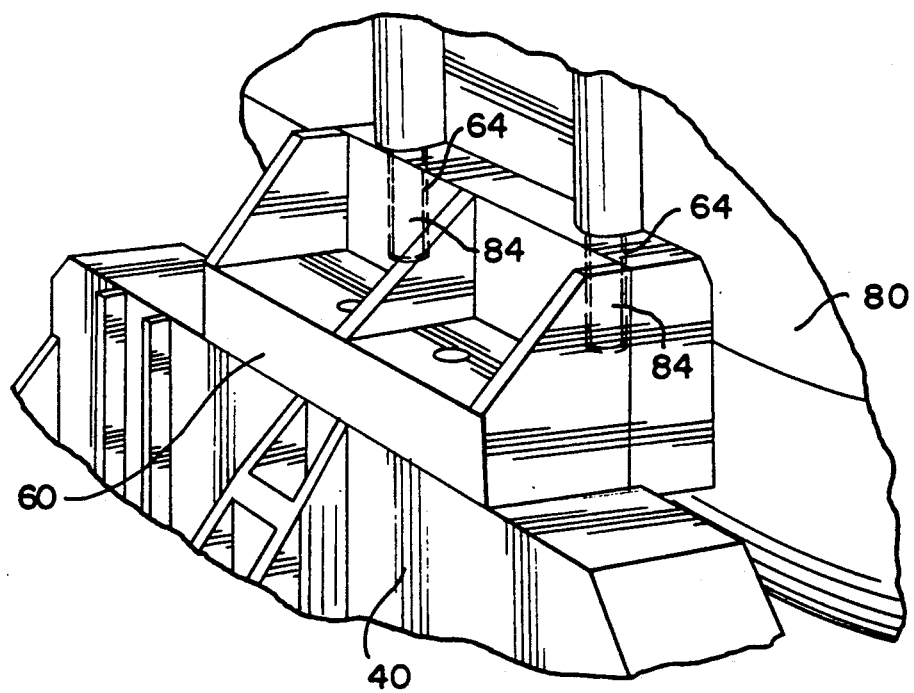
FIG. 5 is an enlarged perspective view of an adapter saddle that is supportably engaging an article with vertical studs.

Although the studs are shown to be pegs or dowels in FIGS. 3-5, it should be understood that a stud can be any protrusion on the surface of the article of manufacture. A stud may even be formed by the ledge of a recess formed in the article of manufacture.

In FIG. 1 the adapter saddle 60 is shown to include male dovetail portions 64 that interlock with the female dovetail portions 42 of the risers 40. This structure provides a means for securably and removably attaching the adapter saddles to the risers. Therefore, adapter saddles with many various shapes and slot arrangements may be attached to a shipping frame. This allows a single shipping frame to be used for shipping or storing a variety of articles of manufacture. Yet, a temporary means for securing an adapter saddle to a riser can be provided, an example being bolt 50 which fits into molded hole 52 as shown in FIG. 1.

FIGS. 6 and 7 show a second embodiment of the invention. In this embodiment leg members 100 and a top skeleton 120 are added to the base 10. The leg members and the top skeleton define the outer margins of the lateral edges and the outer margins of the top sides, and thereby protect an article of manufacture during shipping or storage. Again, these components are preferably made of structural foam material, such as high density polyethylene or other thermoplastics.

FIGS. 6 and 7 show the shipping frame with six leg members 100 that have lower studs 102 that are constructed to removably and securely engage openings 22 and 24 in the peripheral base members 12 and 16. Similarly, the leg members have upper studs 104 constructed to removably and securely engage openings 128 in the peripheral members 122 of the top skeleton 120. Between studs 102 and 104 is a center portion that spaces the base and the top skeleton apart to allow an article to be loaded there between.

The top skeleton 120 is comprised of two pair of peripheral members 122 and 124, and a cross brace member 126 that is integrally molded with and extends between one pair of the peripheral members 122. Constructed in this way, the top skeleton provides lateral support to the shipping frame and allows one loaded shipping frame to be stacked atop another during shipping or storage.

FIGS. 6-7 also reveal a shipping frame structure that can be collapsed after the article of manufacture is delivered and removed. The base 10 is constructed to permit leg members 100 to fit between the pair of risers 40. Base members 14 and 18 are elevated so that the leg members rest squarely on their upper surface. Base members 14 and 18 may also include a pair of restricting members 18 that prevent the legs from sliding laterally during the return shipment. In addition, cross brace 126 of top skeleton 120 has a pair of downwardly extending lips 140 that further prevent the leg members from sliding laterally when assembled in the collapsed position. Lastly, each of top peripheral members 124 has a downwardly projecting flap 142. Thus, when the top skeleton 120 is lowered to nest with the base 10, the leg members 100 are prevented from sliding lengthwise out of the collapsed shipping assembly.

FIG. 9 shows that one collapsed shipping frame may be stacked atop another collapsed shipping frame to again provide a space efficient return of the frames. To accomplish this, the top peripheral members 122 and 124 are provided with upwardly projecting studs 144 that are arranged to engage openings 22 and 24 provided in the base peripheral members 12, 14, 16 and 18.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

I claim:

1. A shipping frame upon which an article of manufacture can be placed for storage and transport, said article having a plurality of studs that are used to support said article, said shipping frame comprising:
    a deck formed of integrally molded base members arranged to define the outer margins of the shipping frame;
    a plurality of risers that are integrally molded with and project upwardly from said deck, said risers being spaced to accommodate said article; and,
    a plurality of adapter saddles that are attached to said risers and shaped to accommodate said article, said adapter saddles having at least one slot for supportably engaging said studs of said article.

2. The shipping frame of claim 1, wherein the shipping frame is molded of structural foam material.

3. The shipping frame of claim 2, wherein said structural foam material is high density polyethylene.

4. The shipping frame of claim 1, further comprising a means for securably and removably attaching said adapter saddles to said risers.

5. The shipping frame of claim 4, wherein said means for securably and removably attaching said adapter saddles to said risers comprises:
    at least one female dovetail portion being formed in each of said risers;
    at least one male dovetail portion being formed in each of said adapter saddles;
    a bottom surface on each of said adapter saddles; and,
    an abutment on each of said risers,
    said at least one male dovetail portion being removably insertable into said at least one female dovetail portion, and said abutment supportably engaging said bottom surface when said at least one male dovetail portion is inserted into said at least one female dovetail portion.

6. The shipping frame of claim 4, wherein said means for securably and removably attaching said adapter saddle to said riser is further comprised of a bolt means.

7. The shipping frame of claim 1, further comprising a means for securably and removably attaching said studs of said article to said at least one adapter saddle.

8. The shipping frame of claim 7, wherein said means for removably and securably attaching said studs of said article to said at least one adapter saddle is a retaining means.

9. The shipping frame of claim 1, wherein said deck has a means for accommodating said article between said base members.

10. The shipping frame of claim 9, wherein said means for accommodating said article between said base members is an opening in said deck.

11. A shipping frame for packaging an article of manufacture for storage and transport, said article having a plurality of studs that are used to support said article, said shipping frame comprising:
    a base, a plurality of leg members, and an top skeleton for joining together into a unitary structure and being adapted to confine an article during storage and transport,
    a) said leg members having:
    a plurality of ends, one end for removably joining with said base and an other end for removably joining with said top skeleton; and,
    a center portion that defines the lateral sides of the shipping frame and spaces said base and said top skeleton apart to accommodate said article,
    b) said base having:
    a deck that defines the outer margins of substantially the bottom side of the shipping frame;
    a plurality of risers that are integrally molded with and project upwardly from said deck, said risers being spaced to accommodate said article;
    a plurality of adapter saddles that are attached to said risers and shaped to accommodate said article, said adapter saddles having at least one slot for supportably engaging said studs of said article; and,
    means for securably and removably joining each of said one end of said leg members to said deck, and
    c) said top skeleton having:
    integrally molded members arranged to define the outer margins of the top side of the shipping frame; and,
    means for securably and removably joining each of said other ends of said plurality of middle members to said upper portion.

12. The shipping frame of claim 11, wherein the shipping frame is molded of structural foam material.

13. The shipping frame of claim 12, wherein said structural foam material is high density polyethylene.

14. The shipping frame of claim 11, further comprising a means for aligning said base with said top skeleton when the shipping frame is collapsed and said base is stacked atop said top skeleton of another shipping frame.

15. The shipping frame of claim 14, wherein said deck has a bottom surface and said top skeleton has a top surface, and wherein said means for aligning said base portion with said top skeleton comprises:
    a plurality of stacking locators on said top surface of said top skeleton; and,
    a plurality of notches in said bottom surface of said deck, said stacking locators being positioned to fit into said notches when said deck is stacked atop said top skeleton of another shipping frame.

16. The shipping frame of claim 11, further comprising a means for securably and removably attaching said adapter saddles to said risers.

17. The shipping frame of claim 16, wherein said means for securably and removably attaching said adapter saddles to said risers comprises:
    at least one female dovetail portion being formed in each of said risers;

at least one male dovetail portion being formed in each of said adapter saddles;

a bottom surface on each of said adapter saddles; and, an abutment on each of said risers, said at least one male dovetail portion being removably insertable into said at least one female dovetail portion, and said abutment supportably engaging said bottom surface when said at least one male dovetail portion is inserted into said at least one female dovetail portion.

18. The shipping frame of claim 16, wherein said means for securably and removably attaching said adapter saddle to said riser is further comprised of a bolt means.

19. The shipping frame of claim 11, further comprising a means for securably and removably attaching said studs of said article to said at least one adapter saddle.

20. The shipping frame of claim 19, wherein said means for removably and securably attaching said studs of said article to said at least one adapter saddle is a retaining means.

21. The shipping frame of claim 11, wherein said deck has a means for accommodating said article between said base members.

22. The shipping frame of claim 21, wherein said means for accommodating said article between said base members is an opening in said deck.

23. A shipping frame for packaging an article of manufacture for storage and transport comprising:

a base, a plurality of leg members, and a top skeleton for joining together into a unitary structure and being adapted to confine the article during storage and transport, a) said leg members having:

a plurality of ends, one of said ends for joining with said base during storage and shipping and an other of said ends for joining with said top skeleton during storage and shipping; and, a center portion for spacing said base and said top skeleton apart to accommodate said article during storage and shipping, b) said base having:

a deck formed of integrally molded peripheral base members arranged to defines the outer margins of substantially the bottom side of the shipping frame;

a plurality of spaced risers that are integrally molded with and project upwardly from said deck;

a plurality of adapter saddles that are attached to said risers; and, means for removably and securably joining said one end of said leg members to said base during storage and shipping, and c) said top skeleton having:

integrally molded peripheral members arranged to define the outer margins of the top side of the shipping frame, said peripheral members having two pair of opposite sides that are shaped to mesh with the base, one pair of said opposite sides having downwardly extending flaps that contain said leg members when the shipping frame is assembled in a collapsed position;

a cross member that extends between and is integrally molded with said peripheral members, said cross member being adapted to mesh with said adapter saddles when the shipping frame is assembled in a collapsed position, said cross member having side portions that contain said leg members when the shipping frame is assembled in a collapsed position; and, means for removably and securably joining said other end of said leg members to said top skeleton during storage and shipping of said article.

24. The shipping frame of claim 23, wherein the shipping frame is molded of structural foam material.

25. The shipping frame of claim 24, wherein said structural foam material is high density polyethylene.

26. The shipping frame of claim 23, wherein said base portion further comprises a means for stabilizing said top skeleton when the shipping frame is assembled in a collapsed position.

27. The shipping frame of claim 23, wherein said base has means for aligning with said top skeleton when said base of one shipping frame is stacked atop said top skeleton of another shipping frame.

28. The shipping frame of claim 27, wherein said deck further comprises a bottom surface and said top skeleton further comprises a top surface, and wherein said means for aligning said base with said top skeleton comprises:

a plurality of stacking locators on said top surface of said top skeleton; and, a plurality of notches in said bottom surface of said deck, said stacking locators being positioned to fit into said notches when said deck of one shipping frame is stacked atop said top skeleton of another shipping frame.

* * * * *